July 17, 1956
J. R. OYLER
2,755,190
FOOD PRODUCT FOR FRUIT PIE FILLING
AND METHOD OF CANNING SAME
Filed April 23, 1954
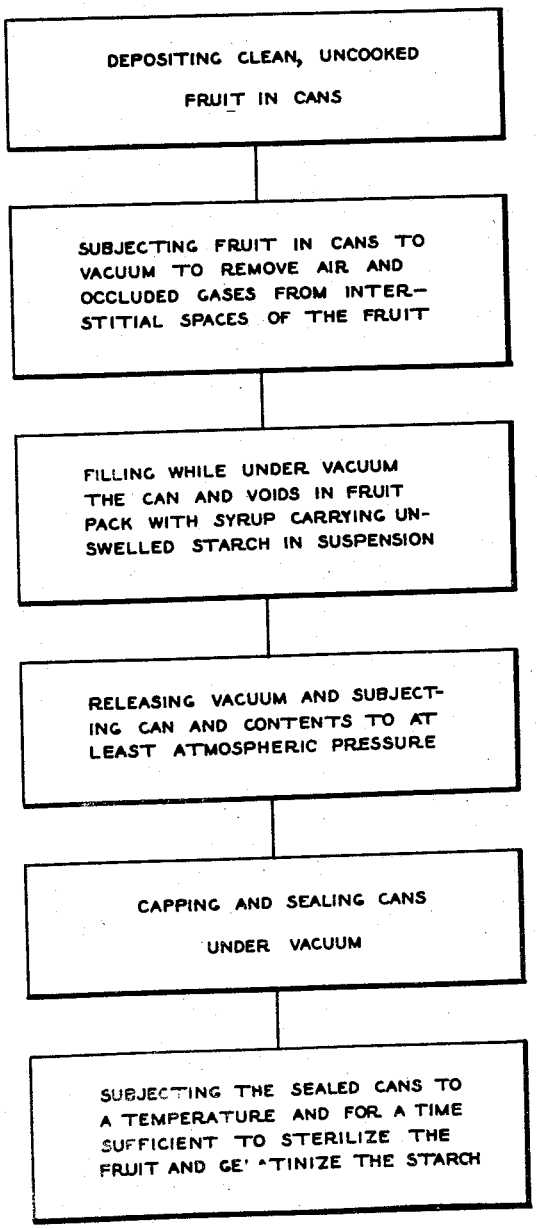
INVENTOR
JAMES R. OYLER
BY
ATTORNEY

United States Patent Office 2,755,190
Patented July 17, 1956

2,755,190

FOOD PRODUCT FOR FRUIT PIE FILLING AND METHOD OF CANNING SAME

James R. Oyler, Gettysburg, Pa., assignor to Knouse Foods Cooperative, Inc., Peach Glen, Pa.

Application April 23, 1954, Serial No. 425,228

12 Claims. (Cl. 99—186)

This invention is a prepared food product, more particularly a fruit pie filling and a method of canning same.

Food products such as fruit pie fillings are known and are available on the market today. However, due to certain deficiencies in the color, flavor, texture, and consistency of such preparations, they have not met with the hoped-for acceptance by housewives and pastry cooks, and in commercial bakeries which employ prepared pie fillings. The present invention has for an object the provision of a prepared fruit pie filling in which the color, flavor, form, and texture of the fruit are substantially that of the raw or uncooked fresh fruit and wherein the consistency of the product does not suffer during baking of the pastry articles in which the filling is used.

Another object of the invention is to provide a method of making prepared food products such as pie fillings of the character described and wherein the fruit content thereof is given a plump, fresh appearance by swelling starch or other thickening agent in situ within the air spaces and interstices of the fibers of the fruit.

Another object of the invention is to provide a process for making fruit pie fillings wherein the manipulation of the fruit during processing is reduced to a minimum, thereby to avoid crushing the fruit.

Another object of the invention is to delay the cooking of the fruit until the can in which it has been packed has been capped and sealed and in which the syrup carrying the thickening material such as starch in suspension still is thin and the starch unswelled, thereby reducing the cooking time to a minimum.

These and other objects of the invention will become apparent from the following specification in which there is outlined in detail a preferred mode of procedure, the essential steps of which are indicated diagrammatically in the accompanying drawing.

The present invention is applicable to all of those fruits usually employed in making pies and fruit filled pastries, particularly fruits such as cherries, strawberries, blackberries, raspberries, blueberries, apples, peaches, and the like.

By way of example, let it be assumed that a prepared strawbery pie filling is to be made. The berries are first capped, washed, and assorted to remove defective fruit. The clean, washed fruit is then delivered to a conventional filling machine which deposits a predetermined quantity of washed, uncooked fruit in the receptacles in which it is to be packed, such as cans, jars, or the like. The receptacles carrying the clean, uncooked fruit are then conveyed in a conventional manner to a vacuum chamber in which a vacuum of from 25 to 27 inches of mercury is maintained in order to remove occluded air and gases from the gas spaces or cavities and interstices of the fruit fibers. The vacuum chamber may include means for filling the cans and the voids within the fruit with a syrup or sweetening agent carrying in suspension unswelled starch or similar thickening agent. When the cans are thus filled with syrup or sweetening agent, they are conveyed to a point outside of the vacuum chamber where they are subject to pressure, atmospheric or greater than atmospheric, which pressure forces the syrup with the unswelled starch in suspension into the air and gas spaces of cavities and into the interstices of the fruit fibers which were evacuated by the preceding vacuumizing step.

In instances where the applied pressure is atmospheric, mere removal of the receptacle from the vacuum chamber will suffice, but if it be desirable to subject the fruit to superatmospheric pressure, the receptacles may be transferred to a pressure chamber wherein a pressure of approximately fifteen (15) pounds per square inch gauge may be maintained by any suitable means. Also, the pressure medium within the pressure chamber may be air, or if desired nitrogen, carbon dioxide, or other inert gaseous medium.

The receptacles containing the fruit and syrup are now conveyed by conventional means to a capping and sealing apparatus of any conventional design, preferably a steam flow sealing machine in which a slight vacuum of from 6 to 10 inches of mercury is maintained. This removes any air that may be present within the can and between the upper surface of the fruit pack therein and the inner face of the can lid, and thus precludes spoilage of the contents. The sealed cans are then transferred in a conventional manner to a rotary steam pressure cooker and agitator and there subjected to a temperature and for a time sufficient to cook or at least sterilize the fruit and to gelatinize or swell the starch. Thus, the starch which was conveyed in unswelled form into the gas or air cavities and interstices of the fruit fibers is swelled or gelatinized in situ and the fruit plumped as the result thereof.

The syrup or sweetening agent which is introduced into the can after the contents of the can have been subjected to a high vacuum of from 25 to 27 inches of mercury, preferably comprises an aqueous solution of sucrose carrying in suspension a thickening agent such as raw or unswelled starch. While the starch may be in the form of corn starch, tapioca, or maize starch, raw or dextrinized, it is preferred to use raw maize starch. Other thickening agents such as gelatin, agar agar, and carboxymethyl cellulose may be used in lieu of starch. Also, the percentage of sucrose and starch in the syrup may be varied depending upon the acidity or tartness of the fruit and the juice content thereof, and the desired consistency in the final product. The syrup may also carry any desired ingredients in the form of flavoring materials, condiments, and the like. The sucrose or sweetening agent employed is in quantities sufficient to sweeten the product to taste, but it should be noted that the percentage of sucrose should not exceed 50% by weight of the prepared filling, since difficulty may be encountered, when the sucrose content exceeds this figure, with proper swelling of the starch. This factor offers no handicap whatever to the operation of the process, since seldom if ever does one desire in the finished product a degree of sweetness comparable to a 50% proportion of sucrose.

The significant features of the process as thus performed are subjecting the cleaned, uncooked fruit to a vacuum to remove the occluded air and gases from the gas spaces or cavities and interstices of the fruit, filling the thus-evacuated gas cavities and interstices with syrup or sweetening agent carrying unswelled starch in suspension, and subsequently swelling the starch in situ at the time the contents of the can are cooked following capping and sealing. Thus, the manipulation or agitation of the fruit is reduced to a minimum, the swelling of the starch in situ within the fruit results in plumping of the fruit, and the cooking of the can contents before or concurrently with the swelling of the starch minimizes the cooking time in view of the fact that heat transfer through the unthickened syrup is much more rapid than it is through a thickened medium.

The process is substantially the same in regard to all of the different fruits mentioned above, the only significant difference being in the variation of percentages of sucrose and starch or other thickening agent employed, dependent upon the nature of the fruit being processed, having regard for juice content and tartness. It has been found that these characteristics of the fruit vary in fruit of different species as well as in fruit of the same species grown in different geographical locations. Thus, by way of illustration and example, the following ranges of concentration for the sucrose and the thickening agents, together with the preferred percentages of sucrose and starch, are suggested as being suitable to meet these varying characteristics in the fruit.

| Fruit | Percent Starch Preferred | Thickening Agent, Percent Range | Percent Sucrose Preferred | Sucrose, Percent Range |
|---|---|---|---|---|
| Apple | 2.3 | 1.9-3.1 | 20.7 | 18.5-25.4 |
| Peach | 3.2 | 2.0-4.1 | 21.1 | 16.7-22.0 |
| Cherry | 2.8 | 2.1-4.6 | 21.9 | 17.4-22.5 |
| Strawberry | 3.8 | 2.2-5.1 | 25.5 | 21.5-27.8 |
| Raspberry | 3.6 | 2.0-4.5 | 25.0 | 20.3-29.0 |
| Blackberry | 3.4 | 2.0-4.7 | 24.8 | 19.9-28.6 |
| Blueberry | 2.9 | 1.8-4.9 | 21.2 | 17.0-25.7 |

It should be noted that the hydrogen ion concentration or the pH of the fruit pie fillings has an important bearing on the flavor of the product and on the swelling characteristics of the starch, as well as upon the stability of the swelled starch. Therefore, the pH of the syrup containing the starch, sucrose, and other ingredients is controlled and adjusted to provide a pH value of from 3 to 6. The preferred pH value is about 3.5. The pH value may be controlled and adjusted in a conventional manner by using sodium citrate to increase an objectionably low pH condition, and either citric acid or lemon juice may be added to lower a high pH value.

The time and temperature of cooking in the final step of the process, during which the starch is swelled in situ within the fruit, is a matter of choice, but it has been found that if the canned pie filling is subjected to a temperature within the range of 190° F. to 210° F. for 7 to 12 minutes, the contents of the can have been properly cooked and the starch completely swelled.

The pie filling preparations prepared as outlined above are found to provide a product in which the fruit retains substantially its natural color, form, and flavor, and in which the fruit has a plump, fresh appearance due to swelling the starch in situ within the interstitial spaces of the fruit, and in which the consistency of the filling remains substantially unchanged, even during baking, due to the fact that no uncongealed fruit juices are retained within the cavities and the interstices of the fruit for release at baking time.

It should be noted in respect to processing apples and peaches for the preparation of prepared pie filling that the same procedure as outlined above is followed, modified, of course, to the extent that the apples and peaches are cleaned, pared, and sliced, the peaches being pitted and the apples cored. Also, due to a somewhat different fibrous texture and density of the apple as compared to that of other fruits used in pie fillings, it is sometimes difficult to get the required bulk of sliced apples into a standard can or jar, but this difficulty may be overcome by subjecting the sliced apples, prior to putting them in the can, to a quick steam blanching step which has the function of collapsing the cells of the fruit on the exterior surfaces of the slices only and to an extent such that the apple slices may be compressed sufficiently within the can to insure the proper bulk for a standard can. This preliminary blanching step in no way interferes with or requires modification of the other steps in the process as outlined above, since the occluded air and gases within the interstitial spaces of the fruit fibers respond to and are removed by the vacuumizing step, and the subsequent pressurizing step forces the syrup and unswelled starch into these spaces in the same manner as occurs with the fruits which are not subjected to a preliminary blanching step. The apple slices in the apple pie filling prepared as outlined herein have substantially the same plump, fresh appearance as do the other fruits when processed as described herein and retain their form and identity in the final product.

In the specification and claims, the term "gelatinize" is used in a generic sense to denote the thickening of the sucrose solution due to hydration of the thickening agent employed, whether the said agent be starch or any of the other thickening agents mentioned. Also, the term "carried in suspension" with reference to the raw starch in the sucrose solution, is used in a generic sense to comprehend unswelled particles of starch in suspension or a colloidal solution or colloidal suspension as may obtain when dextrinized starch or other of the thickening agents specified is used.

It will be understood that the description of the process and product as outlined above is but for the purpose of example only, and it will be recognized by those skilled in the art that changes may be made therein without departing from the spirit of the invention as set forth more particularly in the appended claims.

I claim:

1. The process of canning prepared fruit pie filling comprising placing the washed, uncooked fruit in a can, subjecting the can and contents to vacuum, adding to the can while under said vacuum an aqueous solution of sucrose carrying in suspension a desired quantity of unswelled starch, subjecting the can and contents to at least atmospheric pressure, capping and sealing the can, and then subjecting the can and contents to an elevated temperature to cook the fruit and gelatinize the starch in situ within the fiber interstices of the fruit.

2. The process of canning prepared fruit pie filling comprising placing the uncooked fruit in a can, subjecting the can and contents to vacuum, adding to the can while under said vacuum an aqueous solution of sucrose carrying in suspension a desired quantity of unswelled starch, subjecting the can and contents to superatmospheric pressure, capping and sealing the can, and then subjecting the can and contents to an elevated temperature to cook the fruit and gelatinize the starch in situ within the fiber interstices of the fruit.

3. The process of canning prepared fruit pie filling comprising placing the washed, uncooked fruit in a can, subjecting the can and contents to a vacuum of from 25 to 27 inches of mercury, adding to the can while under said vacuum an aqueous solution of sucrose carrying in suspension a desired quantity of unswelled starch, subjecting the can and contents to normal atmospheric pressure, capping and sealing the can, and then subjecting the can and contents to an elevated temperature to cook the fruit and gelatinize the starch in situ within the air cavities and fiber interstices of the fruit.

4. The process of canning prepared fruit pie filling comprising placing the washed, uncooked fruit in a can, subjecting the can and contents to a vacuum of from 25 to 27 inches of mercury, adding to the can while under said vacuum an aqueous solution of sucrose carrying in suspension a desired quantity of unswelled starch, subjecting the can and contents to at least atmospheric pressure, capping and sealing the can under a vacuum of 6 to 10 inches of mercury, and then subjecting the can and contents to an elevated temperature to cook the fruit and gelatinize the starch in situ within the fiber interstices of the fruit.

5. The process of canning prepared fruit pie filling comprising placing the washed, uncooked fruit in a can, subjecting the can and contents to a vacuum of from 25 to 27 inches of mercury, adding to the can while under said vacuum an aqueous solution of sucrose carrying in suspension a desired quantity of unswelled starch, subjecting the can and contents to at least atmospheric pressure, capping and sealing the can, and then subjecting the can and contents to a temperature within the range of substantially 190° F.–210° F. for a period of from 7 to 12 minutes to cook the fruit and gelatinize the starch in situ within the fiber interstices of the fruit.

6. A prepared fruit pie filling characterized by the fact that the air cavities and interstitial spaces of the fibers of the fruit content thereof contain swelled starch.

7. A prepared fruit pie filling characterized by the fact that the air cavities and interstitial spaces of the fibers of the fruit content thereof contain swelled starch in the presence of an aqueous solution of sucrose.

8. A prepared fruit pie filling characterized by the fact that the air cavities and interstitial spaces of the fibers of the fruit content thereof contain swelled starch in the presence of an aqueous solution of sucrose, the starch being present in proportions ranging between 1.5% to 6% by weight of the pie filling.

9. In the canning of prepared fruit pie fillings, the process which comprises placing uncooked fruit in a can, subjecting the can and contents to a vacuum, adding to the can while under the vacuum an aqueous solution of a sweetening agent carrying in suspension therein from about 1.5% to 6% of raw starch, then increasing the pressure on the can to at least atmospheric pressure, capping and sealing the can, then at least partially cooking the fruit in the can under conditions causing sterilization and gelatinization of the starch.

10. In a process of canning prepared fruit pie filling, the steps of removing the occluded air and gases from the gas cavities and interstitial spaces of the fruit by subjecting the same to a vacuum, immersing the fruit, while under vacuum, in an aqueous solution of sucrose carrying raw starch in suspension, subjecting the fruit while so immersed to a pressure equal at least to atmosphere, thereby to force into the thus evacuated air cavities and interstitial spaces of the fruit, portions of said aqueous solution of sucrose carrying raw starch in suspension and then concurrently cooking the fruit and swelling the starch in situ.

11. The process of canning prepared fruit pie filling comprising placing the washed, uncooked fruit in a can, subjecting the can and contents to a vacuum of from 25 to 27 inches of mercury, adding to the can while under said vacuum an aqueous solution of sucrose having a pH value of from 3.4 to 3.7 and carrying in suspension a desired quantity of unswelled starch, subjecting the can and contents to at least atmospheric pressure, capping and sealing the can, and then agitating the can while subjecting the can and contents to a temperature within the range of substantially 190° F.–210° F. for a period of from 7 to 12 minutes to cook the fruit and gelatinize the starch in situ within the gas cavities and fiber interstices of the fruit.

12. In the canning of prepared fruit pie fillings, the process which comprises placing uncooked fruit in a can, subjecting the can and contents to a vacuum, adding to the can while under the vacuum an aqueous solution of a sweetening agent carrying in suspension therein from about 1.5% to 6% of unswelled thickening agent, then increasing the pressure on the can to at least atmospheric pressure, capping and sealing the can, then at least partially cooking the fruit in the can under conditions causing sterilization and gelatinization of the thickening agent.

References Cited in the file of this patent

UNITED STATES PATENTS

| Number | Name | Date |
|---|---|---|
| 1,279,379 | Sellars | Sept. 17, 1918 |
| 1,467,746 | Allen | Sept. 11, 1923 |
| 2,563,996 | Edgar | Aug. 14, 1951 |

OTHER REFERENCES

"Thickeners Used in Pie Fillings," by Bisno, Baker's Digest, April 1951, pages 29–34.